Patented Mar. 31, 1942

2,277,714

UNITED STATES PATENT OFFICE 2,277,714

SAMPLER

John Ray Polston and Joseph Johnson Boyd, Tulsa, Okla., assignors to Stanolind Pipe Line Company, Tulsa, Okla., a corporation of Maine Application December 29, 1939, Serial No. 311,635

5 Claims. (Cl. 73—21)

This invention relates to devices for sampling liquids flowing through pipe lines. More particularly, it relates to devices for automatically collecting composite samples of liquids flowing through pipe lines at a rate which is roughly proportional to the quantity of fluid passing through the pipe line.

Numerous devices are known in the art for sampling liquids flowing through pipe lines but in general these are subject to at least two defects in that they require some outside source of power which is frequently difficult to supply at the point where the sample is to be taken and in that they are generally operated by some sort of clock-work mechanism so that the individual portions which go to make up the composite sample are taken at predetermined time intervals which cannot be readily adjusted to the rate of flow of fluid through the pipe line so that the composite sample is not truly representative unless the rate of flow is constant. Devices are known which are free of the disadvantages mentioned but in these a portion of the fluid in the pipe line is continuously drawn off into a sample container. This is disadvantageous in that it necessitates either an inordinately large sample or an extremely small continuous stream which cannot be controlled accurately. Valve control of a very small stream is almost impossible due to clogging, corrosion, erosion, etc.

It is, therefore, an object of the present invention to provide a device for sampling fluids flowing through pipe lines which possess the advantages of these prior art devices without their attending disadvantages. A further object is to provide a device for collecting a composite sample of a fluid flowing through a pipe line at a rate proportioned to the rate of flow of fluid in the pipe line. A still further object is to provide a device for sampling fluids flowing through pipe lines which is operated entirely by the pressure of the fluid flowing through the pipe line. A still further object is to provide a device for taking a composite sample of a fluid flowing through a pipe line which takes uniform discrete samples at a rate proportioned to the rate of flow of fluid through the pipe line and combines them to form the composite sample. A more general object is to provide a device of the type mentioned which may be located anywhere along a pipe line without requiring long distance transmission of energy to operate it. Other objects will appear hereinafter.

Figure 1:
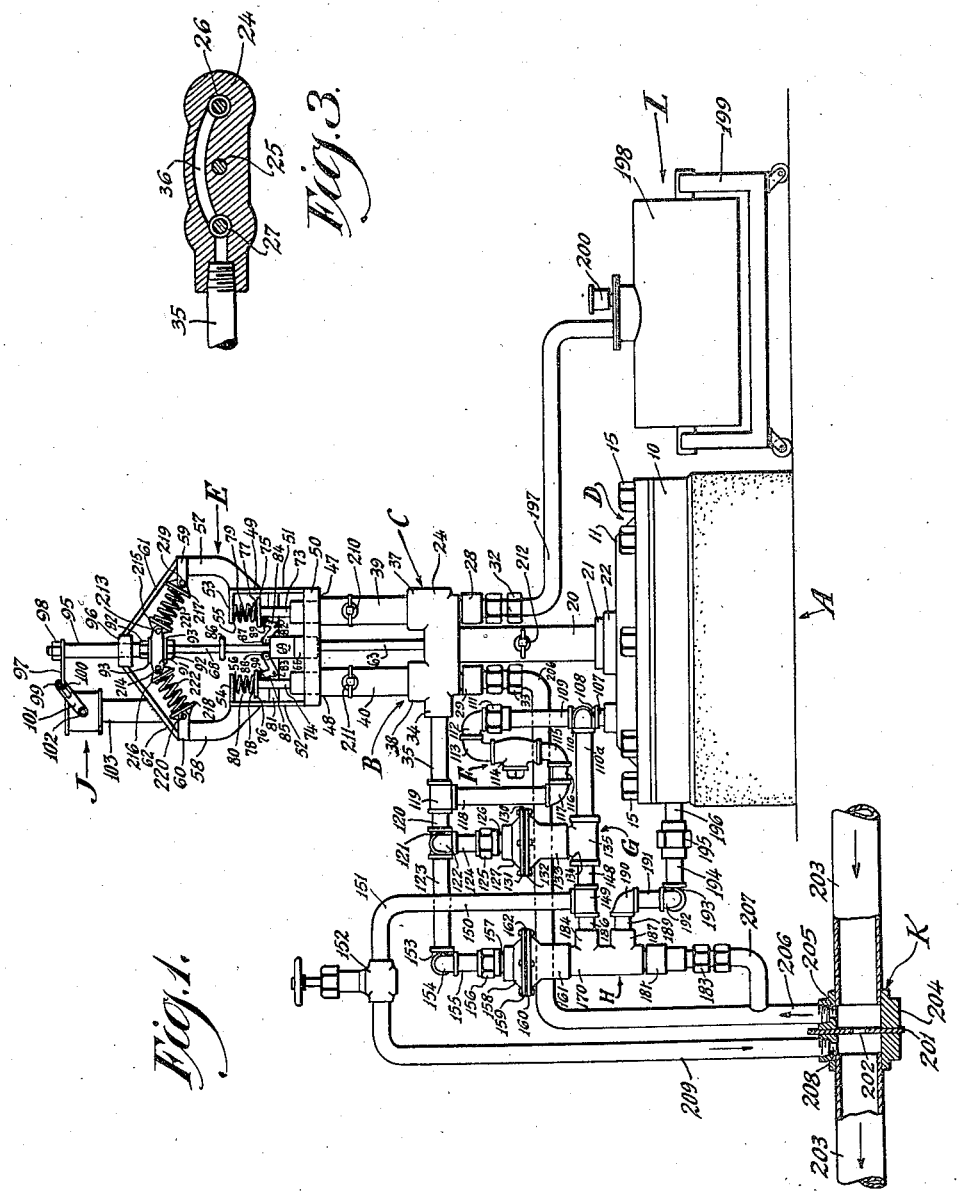
Figure 2:
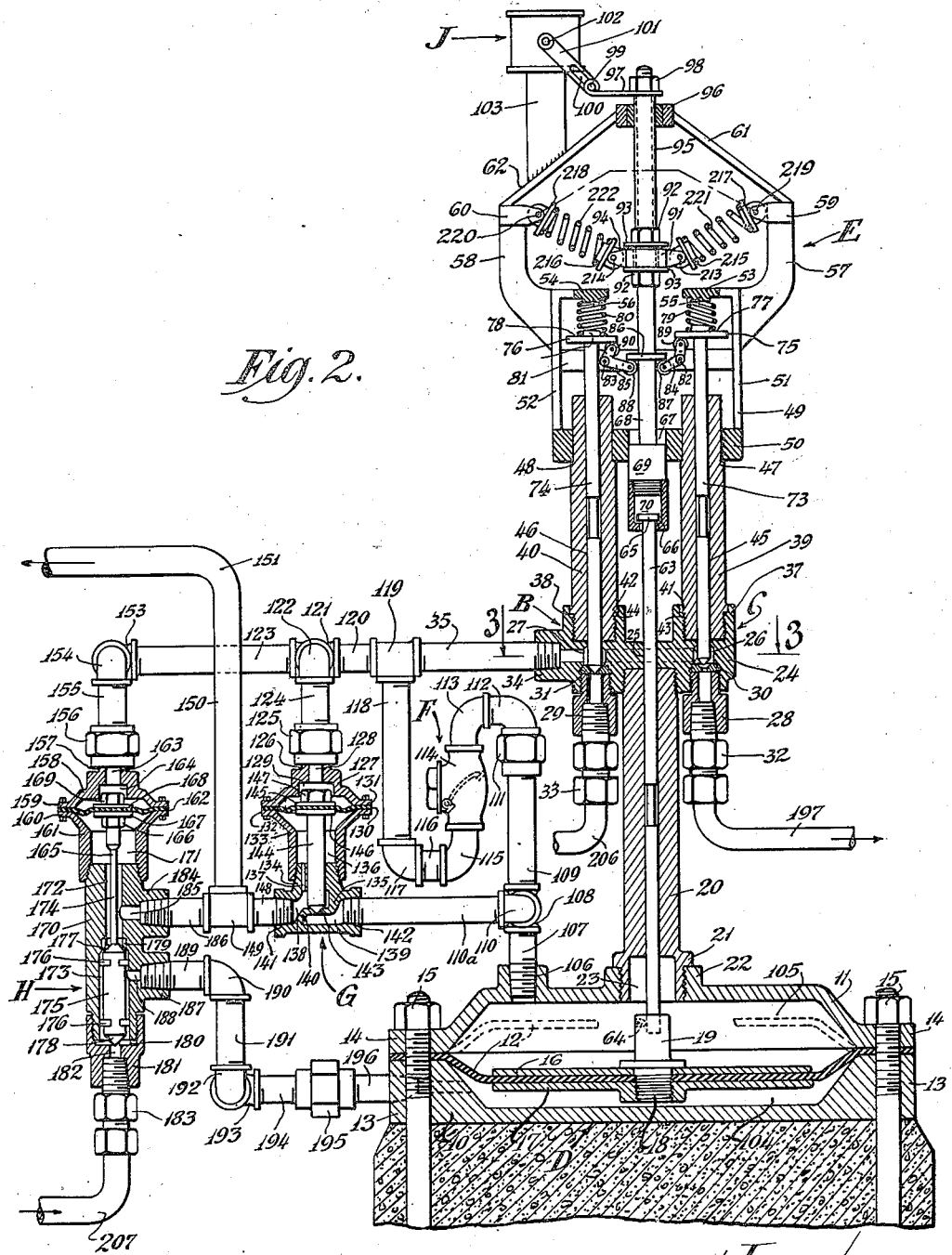

These objects are accomplished by a device one embodiment of which is illustrated in the accompanying drawings. In these drawings Figure 1 is a diagrammatic elevation partly in section showing the complete arrangement of this preferred embodiment. Figure 2 is a diagrammatic elevation partly in section illustrating in detail the system of valves and diaphragms employed in the same embodiment shown completely in Figure 1. Figure 3 is a section on the line 3—3 in Figure 2. It will be understood, of course, that the invention is not limited to the preferred form shown which is included for purposes of illustration only.

Referring to the drawings it will be seen that the device is composed of a supporting base A, two valves B and C jointly operated by a diaphragm control D through a spring trip mechanism E, a check valve F, a diaphragm controlled valve G, a diaphragm controlled two-way valve H and a counter J all mounted on the upper side of base A, an orifice plate K, and a sample container L. The spring trip mechanism E causes reversal of high and low pressures to alternate sides of diaphragm control D, thus producing a two-way or double-acting travel of diaphragm control D.

Auxiliary diaphragm controlled valves G and H are used for two purposes: (1) to measure and discharge liquid sample and (2) to release high and low pressures to alternate sides of diaphragm control D at the end of each stroke. Valve G is a single seated one-way flow valve and valve H is double seated two-way flow. Valve G handles low pressure only whereas valve H alternately handles high and low pressure. Small check valve F is used to admit high pressure to the upper side of diaphragm control D only during one stage of the operating cycle and to prevent low pressure from traveling back the same way at another stage of the operating cycle. The orifice plate K is arranged across a pipe line through which the fluid to be sampled is flowing. This may, for example, be an oil pipe line. Since fluid is flowing through the pipe, pressure on the up-stream side of the orifice plate will be greater than that on the down-stream side and the pressure drop across the orifice plate will be a function of the rate of flow of fluid through the pipe line. This pressure differential together with a pressure differential established between the down-stream side of the orifice plate and the sample container by setting the air relief valve on sample container L above the vapor pressure of the sample but below the pressure on the down-stream side of the orifice plate serve to operate the device. Thus the device operates on pressure differential only and is not affected by changes in static pressure, as long as static pressure remains within the predetermined normal operating range.

Diaphragm control D is caused to move back and forth and actuate spring mechanism E by alternately placing its opposite sides in communication with the fluid on the up-stream side of orifice plate K. The device is also arranged so that when one side of diaphragm control D is in communication with the up-stream side of the orifice plate the other side is always in communication with the down-stream side. As diaphragm control D moves back and forth it alternately opens valve B as it closes valve C and then reverses the process. When valve B is open fluid enters through this valve from the up-stream side of the orifice plate and fills the space between valve C and the diaphragms controlling valve G and two-way valve H. At the same time that this space is being filled, up-stream pressure is being exerted on diaphragm control D in such a way as to move it to a position where it will cause spring mechanism E to close valve B and open valve C. This places the spaces between valve C and the diaphragms controlling valve G and two-way valve H in communication with the sample container L so that the sample is thereupon ejected into the container. The diaphragms controlling valve G and two-way valve H are always in communication on one side with the down-stream side of the orifice plate K, and this pressure being greater than that in the sample container L causes these diaphragms to move so as to eject the sample into the sample container. The purpose of valve G and two-way valve H is to control the communication between the chambers on either side of diaphragm control D and the fluid on either side of orifice plate K. They accomplish this in cooperation with check valve F and valve B.

Having thus described in general the device which forms the subject matter of this invention, a more detailed description of its operation is given in order that it may be better understood. A supporting base A is provided upon which rests a circular plate 10 having a hollow concave portion therein, another plate 11 also having a hollow concave portion being arranged above plate 10 in such a way that the hollow concave portions of these plates are opposed and form a chamber. Between these plates is a flexible diaphragm 12 forming part of diaphragm control D arranged so that its outer periphery is engaged between rims 13 and 14 of plates 10 and 11 which are in turn secured together and to the base A by stud bolts 15. On either side of diaphragm 12 are provided plates 16 and 17. These plates are provided as is diaphragm 12 with a hole in the center to receive bolt 18, plate 17 being provided with threads into which this bolt is screwed. Bolt 18 has a head portion 19 which is larger than the hole in plates 16 and 17 and diaphragm 12 and it is inserted into plate 16 and through diaphragm 12 before it is screwed into plate 17 so that when it is screwed into plate 17 it holds the two plates firmly together with the diaphragm between them.

Into a threaded opening in the center of plate 11 a rod 20 is screwed. Lip 21 is provided near the lower end and when this is screwed down tightly upon the upwardly extended portion 22 of plate 11 a fluid tight joint is made. The lower end of rod 20 has a cylindrical opening 23 therein to receive the upper portion 19 of bolt 18 and a longitudinal opening extends through rod 20 from the lower cylindrical opening 23 to the upper end. A valve body 24 is threaded to receive the upper end of rod 20. Valve body 24 has an opening 25 therethrough which is in alignment with the longitudinal opening in rod 20. Valve body 24 is also provided with two chambers 26 and 27. Communicating with each of these chambers is a threaded opening into which are screwed plugs 28 and 29 which respectively hold valve seats 30 and 31 in position. These plugs are provided with concentric longitudinal openings which at their lower ends are tapped to receive the tapped portions respectively of pipe connecting assemblies 32 and 33. Valve body 24 is also provided with outwardly extending portion 34 in which a hollow opening extends from chamber 27 to a tapped portion in the end thereof adapted to receive pipe 35. A port 36 (Figure 3) is also provided in valve body 24 to connect chamber 26 and chamber 27. Finally valve body 24 is provided with two upwardly extended threaded portions 37 and 38 arranged to receive the threaded ends of tubes 39 and 40 respectively. Tubes 39 and 40 are provided respectively with lips 41 and 42 which are drawn up against shoulders 43 and 44, thus providing tight joints. Extending longitudinally upward through the centers of each of tubes 39 and 40 are openings 45 and 46. The upper ends of tubes 39 and 40 are of smaller diameter than the lower portions so that shoulders 47 and 48 are formed thereon.

Special casting 49 has a circular base 50 provided with openings therethrough positioned to receive the upper ends of tubes 39 and 40. The shoulders 47 and 48 on tubes 39 and 40 then support casting 49. Casting 49 has upwardly extending portions 51 and 52 on its opposite sides which in turn are provided at their upper ends with rounded parts 53 and 54 which extend in parallel with base 50 and are fitted on their under sides 55 and 56 with spring seats. Extending out and up from the upper ends of parts 51 and 52 are arms 57 and 58. Clamps 59 and 60 from which guide bearing supports 61 and 62 extend up diagonally are secured around the upper ends of arms 57 and 58.

Returning now to bolt 18 it will be noted that the lower end of control rod 63 is inserted in a hole in the top portion 19 of said bolt 18 and held therein by a set screw 64. Control rod 63 extends slidably up through the opening in rod 20 and the opening 25 in valve body 24. Control rod 63 is grease sealed in the opening in which it slides. It is provided at its upper end with a disc portion 65 at the top. A cup 66 having a hole in the bottom through which the upper end of control rod 63 slides fits up around disc portion 65. Extending down through circular opening 67 in casting 49 is another rod 68 having an enlarged lower end 69 which slides in opening 67. The enlarged end 69 of rod 68 is threaded and cup 66, which is tapped, screws onto it. Cup 66 is formed so that when it is screwed up tight against enlarged end 69 a chamber 70 is formed between the end 69 of rod 68 and the bottom of cup 66 in which the disc portion 65 of control rod 63 is free to move.

Slidably mounted and grease sealed in openings 45 and 46 are rods 73 and 74. The lower ends of these rods 73 and 74 are conical shaped to fit tight against seats 30 and 31 when pressed down upon them and thus cut off fluid flow through the respective valves C and B. On the upper ends of these rods, disc-like members 75 and 76 are provided on the upper side of which are spring seats 77 and 78. Springs 79 and 80 are compressed between these seats and spring seats 55 and 56, respectively, and operate to close valves C and B, respectively, when released.

A member 81 extending between parts 51 and 52 of special casting 49 and supported by them is provided with fulcrums 82 and 83 extending horizontally therefrom alongside rods 73 and 74, respectively. These fulcrums are placed so that cams 84 and 85 may turn upon them and so that their vertical center lines extended intersect discs 75 and 76, respectively. Cams 84 and 85 do not turn freely on fulcrums 82 and 83 and thus turn only when and only as much as they are pushed. Shoulder 86 on rod 68, cams 84 and 85 and fulcrums 82 and 83 are so arranged that when shoulder 86 is at the lowest point to which it moves, cam rollers 87 and 88 rest against it on its under side. At this time the vertical center line of cam roller 89 is in line with the vertical center line of fulcrum 82.

On the other hand, cam roller 90 is not directly above the center of fulcrum 83 but instead is over and down far enough so that spring 80 can extend sufficiently to seat the conical lower end of rod 74 in valve seat 31. Cams 84 and 85 are also constructed and placed so that when enlarged portion 69 of rod 68 moves up to the highest point it reaches, cam rollers 87 and 88 rest on top of it and the vertical center line of cam roller 90 is in line with the vertical center line of fulcrum 83 while cam roller 89 is sufficiently far down and over so that spring 79 can extend enough to seat the conical lower end of rod 73 in valve seat 30.

Above shoulder 86 fulcrum journal 91 is arranged on rod 68 as shown in the drawings. Fulcrum journal 91 is held in place on rod 68 by nuts 92 and washers 93 which are pulled up tight against spacing sleeve 94, around which the fulcrum journal 91 is fitted. A sleeve 95 is fitted over rod 68 above upper nut 92 upon which it rests. This sleeve is slidably mounted in guide bearing 96. Both rod 68 and sleeve 95 extend above guide bearing 96 and that portion of rod 68 which extends beyond sleeve 95 is threaded. An arm 97 is fitted to the upper end of rod 68. A hole is provided near the end of arm 97 so that it can be passed down over rod 68 and rest on sleeve 95. Nut 98 is then screwed up tightly against it to hold it firmly in place. The other end of arm 97 is rolled around a pin 99 which also passes through a slot 100 running lengthwise of another arm 101. The other end of arm 101 is secured to the shaft 102 of counter J. Counter J is held up by a support 103 which is secured to the upper side of guide bearing support 62. Counter J may be of any desired type so long as it will record the number of strokes of rod 68, or, with suitable modification, any desired units of quantity.

On either side fulcrum journal 91 is provided with fulcrum points 213 and 214. Inner spring seats 215 and 216 are, respectively, mounted on the fulcrum points 213 and 214 so that they are free to turn in a vertical plane. Outer spring seats 217 and 218 are, respectively, mounted on fulcrum points 219 and 220 and are similarly free to turn. Fulcrum points 219 and 220 are provided on inwardly extending portions of clamps 59 and 60. Between seats 215 and 217 a spring 221 is mounted and between seats 216 and 218 a similar spring 222 is mounted.

The above completes the description of the spring mechanism. The following is accordingly concerned with the parts of the device through which the fluid being sampled flows. The arrangement of plates 10 and 11 with diaphragm 12 is described above. It will be seen that the diaphragm 12 divides the hollow space between these plates into two chambers 104 and 105. A threaded opening 106 is provided through plate 11 into chamber 105. Into opening 106 a pipe 107 is screwed which, in turn, is connected to a T 108. The other two outlets of T 108 are connected, respectively, to pipe 109 and elbow 110. Pipe 109 is also connected to union 111 which is in turn connected to elbows 112 and 113 which connect to the outlet of check valve 114. The inlet of check valve 114 is connected by elbow 115, pipe 116, elbow 117 and pipe 118 to T 119. It has been pointed out above that one end of pipe 35 is connected to an outlet from chamber 27 in body 24. The other end of pipe 35 is connected to another outlet of T 119, the third outlet of which is connected to pipe 120. This also connects to another T 121, the other two outlets from which connect with elbow 122 and pipe 123, respectively. Elbow 122 on the other end connects with pipe 124 which in turn connects with union 125. This union 125 screws onto the threaded upper end 126 of circular diaphragm housing head 127. Head 127 has port 128 extending through it, and is shaped so that this port opens into a chamber 129 formed by head 127 and diaphragm 130. The diameter of head 127 increases until it flattens out at the bottom into a flange 131. Between flange 131 and a similar flange 132 on body portion 133 the outer periphery of diaphragm 130 is placed and the flanges are secured together by bolts. The body portion 133 is hollow and circular in shape. The upper portion is of about the same diameter as the lower part of head 127. It tapers both inside and outside for part of the way down so that the lower portion has a smaller diameter. The bottom part of body portion 133 is internally threaded and when the leg 134 of T shaped valve housing 135 is screwed into it a chamber 136 is formed between the upper end of leg 134 and diaphragm 130. A port 137 extends through leg 134 to the hollow interior of valve housing 135. The hollow interior of valve housing 135 is divided into two chambers 138 and 139 by a wall 140. Opening 141 of valve housing 135 is in chamber 138 and opening 142 is in chamber 139. A conical shaped opening 143 is provided in wall 140 to permit fluid flow between the chambers and is positioned so that the tapered lower end of rod 144 can be seated in it to close it. Rod 144 is slidably mounted in an opening in leg 134. The upper end of rod 144 is of smaller diameter than the lower portion so that a shoulder is formed on it. Diaphragm plates 145 and 146 and diaphragm 130 are all three provided with holes in the center large enough to slide over the threaded upper end of rod 144 but small enough so that they rest on the shoulder. Nut 147 is screwed onto the threaded end of rod 144 and holds the plates with the diaphragm between them down tightly against the shoulder. Pipe 118a which has one end screwed into elbow 110 has the other end screwed into opening 142 of valve housing 135. The third opening 141 of this valve housing is threaded to receive one end of pipe 148, the other end of which is screwed into one opening of T 149. Into the leg of T 149 is screwed pipe 150 which has a 90° turn in it at 151 and the other end of which pipe is screwed into one port of valve 152.

Returning now to pipe 123 which has been mentioned above as having one end threaded into an opening of T 121, it will be noted that the other end of pipe 123 is connected to one opening of elbow 153 which in turn threads into elbow 154. Elbow 154 has pipe 155 threaded in its other opening and pipe 155 connects to union 156. This union 156 screws onto the threaded upper end 157 of circular diaphragm housing head 158. Head 158 is the same in construction as head 127 on the housing of diaphragm controlled valve G.

Between flange 159 on head 158 and a similar flange 160 on body portion 161, the outer periphery of diaphragm 162 is placed and the flanges are secured together by bolts. A port 163 extends through the tapped upper end of head 158 and opens into the chamber 164 formed by head 158 and diaphragm 162. The upper end of rod 165 is threaded. Nut 166 is first screwed onto it then diaphragm plate 167 which has a suitable opening in the center is placed on it. Diaphragm 162 and plate 168 both of which are also provided with holes in the center, are then put on and nut 169 is then turned down on top of them. Nuts 166 and 169 are screwed up tight against the plates and thus the diaphragm 162 is firmly secured to rod 165. The threaded upper end of a valve housing 170 is screwed into the internally threaded lower opening of body portion 161. This forms a chamber 171. Extending through housing 170 is a longitudinal opening the upper part 172 of which is of relatively small diameter and the lower part 173 of which is of larger diameter. Rod 165 which is slidably mounted in openings 172 and 173 is formed with a medium sized upper end which is secured to diaphragm 162 as described above. Below this is a portion 174 of rod 165 which is of smaller diameter being of such size that when placed in opening 172 sufficient free space is left to permit the passage of fluid therethrough. The lower portion 175 of rod 165 which is mounted in opening 173 is enlarged but is still small enough to permit fluid to pass through opening 173 when it is fitted therein. Enlarged portion 175 is provided with guides 176 to hold it in alignment in the chamber 173 and both its upper end 177 and its lower end 178 are conical in shape and are adapted to fit, respectively, into valve seats 179 and 180. Seat 179 is driven into the upper end of opening 173. The lower seat 180 is placed against the threaded lower end of valve housing 179. Seat 180 is held in place by cap 181 which is screwed onto the threaded lower end of housing 170. The cap 181 has an opening 182 therethrough which expands at the lower end into an enlarged internally threaded portion into which pipe connecting assembly 183 is screwed.

A longitudinal opening 184 provided in valve housing 170. Running lengthwise of part 184 from opening 172 to the outside of the valve housing is an opening 185. This opening is small on its inner end but becomes larger near its outer end which is threaded. Into this threaded portion of part 184, pipe 186 is screwed. The other end of pipe 186 is screwed into T 149. Similarly the cavity or opening 173 communicates with nipple 187 provided in valve housing 170. A lengthwise opening 188 is also provided in part 187 running from opening 173 to the outside of valve housing 170. This opening likewise is small on its inner end but becomes larger on its outer end where threads are provided into which pipe 189 is screwed. Screwed onto the other end of this pipe and to each other in sequence are an elbow 190, a pipe 191, an elbow 192, an elbow 193, a pipe 194, a union 195, and a pipe 196. The other end of pipe 196 is screwed into an internally threaded opening in plate 10. This opening goes through plate 10 and opens into chamber 194 becoming smaller as it passes beyond the threaded part.

Pipe 197 extends from the lower end of pipe connecting assembly 32 to sample container L and completes a fluid connection between the opening in plug 28 and the sample container L. A gas-tight connection is made between pipe 197 and sample container L. Sample container L comprises a tank 198 mounted on a truck 199. In addition to the opening through which pipe 197 enters, sample container L is also provided with an adjustable air relief valve 200.

Referring particularly to Figure 1 of the drawings, it is seen that an orifice plate 201 having an orifice 202 is arranged in pipe line 203 wherein it is held in position by orifice flange 204. Port 205 in orifice flange 204 is located on the upstream side of orifice plate 201 as indicated by the arrows showing the direction of flow in the pipe line. Pipe 206 communicates with port 205 on one end and through pipe connecting assembly 33 with the opening in plug 29 at the other end and admits up-stream pressure to the opening in plug 29. Pipe 207 goes off from the side of pipe 206 and through pipe connecting assembly 183 admits upstream pressure to the opening 182 in cap 181. Similarly port 208 and pipe 209 connect valve 152 with pipe line 203 on the downstream side of the orifice plate 201.

It is apparent that means for preventing leakage around movable parts is desirable. This can be accomplished in any desired way, for example, by the use of stuffing boxes but preferably leakage is prevented by cap fitting such parts into their housings and providing grease seals. Thus rods 63, 73, and 74 are lap fitted into the openings in which they slide and grease seal cups 210, 211, and 212 are fitted into tapped openings in tubes 39 and 40, and rod 28, respectively, to force grease stick lubricant around the rods to form a grease seal. The grease stick used is a compound which is insoluble in the liquid being sampled.

The drawings are not made to scale because the device can be more adequately shown as presented. It is contemplated that the size of orifice hole 202 in orifice plate 201 and the area of diaphragm 12 will be calculated for each installation, the latter depending in part, at least, on the minimum differential that the sampler will be required to operate on. Other parts of the sampler can be standardized except in so far as they are affected by variations in the orifice hole 202 and the area of diaphragm 12, but it should be understood that the invention is not intended to be limited to any particular sizes of parts. Thus the parts may be of any desired size even though a particular size may be suitable for most installations so that for commercial purposes it is advantageous to standardize many of them. It is advantageous, for example, in a device as shown to arrange disc portion 65, cup 66, and lower end 69 of rod 68, so that about $\frac{1}{16}''$ of free movement is allowed to disc portion 65 inside cup 66 or some similar free movement depending on the travel of cam rollers 87 and 88. The advantage of this free space becomes apparent from the description hereinafter of the operation of the device.

The various parts of the device may be constructed of any desired materials depending upon the fluid to be sampled. Proper materials of construction will, in general, be apparent to the skilled engineer. Where the fluid which is to be sampled is oil it is preferred that the diaphragms 12, 130, and 162 be formed of an oil resistant flexible synthetic material such as neoprene or one of its cross polymers, an olefin polysulfide plastic or a rubber-like polymer or cross polymer of butadiene-1,3.

Description of operation

A better understanding of the device will be had from a description of its operation in removing samples of liquid from a pipe line through which a fluid, for example, oil, is flowing under pressure. The device is in the position shown more particularly in Figure 2. Air relief valve 200 is set at a pressure of about three ounces per square inch (which is substantially lower than the pressure on the downstream side of orifice plate 201), and the device is full of the fluid to be sampled. The pressure on the down-stream side of orifice plate 201 will be exerted on the underside of diaphragm 162 through opening 172, opening 185, and the line running from the latter opening to the downstream side of orifice plate 201. Through the same line, chamber 138 and port 137, down-stream pressure will also be exerted on the under side of diaphragm 130. The upper sides of these diaphragms through the lines leading from the tops of their respective housings to chamber 27, port 36, chamber 26, valve seat 30 and the line connecting it to the sample container L are exposed to sample container pressure only and thus diaphragms 130 and 162 move upward to the upper limit of their travel forcing liquid out of the space connecting them to sample container L and into the latter. This liquid so forced into the sample container is the sample. The quantity of liquid so forced into sample container L is determined by the combined displacements of the two diaphragms and this in turn is a function of their areas and travel. The latter two dimensions for a given embodiment of the device are fixed and thus each sample is of exactly the same quantity. As will be seen later, this discharge occurs once during each operating cycle so that the device discharges equal samples with each complete operating cycle.

It will be noted that diaphragm 162 being secured to rod 165 lifts the rod as it rises so that the lower end 178 of the rod lifts out of seat 180 and the upper end 177 moves up into seat 179. Pipe 207 communicates with the upstream side of orifice plate 201 so that fluid under high pressure now flows through opening 173 and out opening 188 to the under side of diaphragm 12. At the same time, diaphragm 130 also lifts rod 144 out of seat 143, and through the opening thus made the upper side of diaphragm 12 is placed in fluid communication with the downstream side of orifice plate 201, through pipe 107, pipe 110a, chambers 139 and 138, and the line leading from 138 to the down-stream side and is thus subjected to a lower pressure than is the under side of diaphragm 12. As a result of this pressure difference fluid flows into chamber 104 forcing diaphragm 12 to move upward and in turn force liquid out of chamber 105 and back to the pipe line on the down-stream side. As diaphragm 12 moves upward it pushes rod 63 up which in turn pushes rod 68 up to which fulcrum journal 91 is attached. This continues until fulcrum points 213 and 214 in one embodiment of the invention are about ¼" above the horizontal center of fulcrum points 219 and 220. At this point springs 221 and 222 have created enough upward force to cause rod 68 to jump upward (which it is free to do because of the $\frac{5}{16}$" or the like free play in the coupling assembly involving rods 63 and 68 and cup 66) causing the top of enlarged portion 69 of rod 68 to strike cam rollers 87 and 88 and force them upward about ¼", for example. This upward movement of cam rollers 87 and 88 causes cam roller 90 to move upward about $\frac{3}{32}$", and cam roller 89 to move downward about $\frac{3}{32}$". The upward movement of cam roller 90 raises disc 76 on top of rod 74 against the tension of spring 80 and lifts the conical lower end of rod 74 out of seat 31 and thus admits fluid under upstream pressure into chamber 27 and communicating openings from pipe 206 which leads from the upstream side of orifice plate 201. At the same time the downward movement of cam roller 89 permits spring 79 which is under compression to force down disc 75 on top of rod 73 and seat the conical lower end of rod 73 in seat 30 thus cutting off communication between sample container L and chamber 26 and communicating passages.

Among the openings communicating with chamber 27 which are now filled with fluid under upstream pressure are chambers 129 and 164 above diaphragms 130 and 162. It will be noted that when the device is in operation the chambers 136 and 171 below diaphragms 130 and 162 are always filled with fluid under downstream pressure. Upstream pressure on the upper sides of the diaphragms thus forces them down permitting more fluid under high pressure to flow into chambers 129 and 164 and causing fluid under lower pressure to flow out of chambers 136 and 171. The downward movement of diaphragm 130 seats the tapered lower end of rod 144 in seat 143 and thus cuts off flow from chamber 105 above diaphragm 12 to the downstream side orifice plate 201. At the same time the downward movement of diaphragm 162 seats the conical lower end 178 of rod 165 in seat 180 and thus cuts off the flow of high pressure fluid from pipe 207 through chamber 173 to chamber 104 under diaphragm 12. This same movement of diaphragm 162 also drops conical end 177 of enlarged portion 175 of rod 165 out of seat 179 and thus puts chamber 104 in communication with the downstream side of orifice plate 201. In addition to chambers 129 and 164 and other openings, the inlet side of check valve 114 is also in communication with chamber 27. The outlet side of check valve 114 communicates with chamber 105 above diaphragm 12 and thus fluid under high pressure now flows from chamber 27 through check valve 114 into chamber 105. The under side of diaphragm 12 now being under lower pressure the flow of high pressure fluid into chamber 105 forces diaphragm 12 down and this in turn forces fluid out of chamber 104 and back to the pipe line on the downstream side of the orifice plate 201 with which it is in communication as described above.

It will be observed that with the device in the position shown in Figure 2, at which stage of the operation this description started, the inlet side of check valve 114 is in communication with sample container L and is thus under sample container pressure while the outlet side which communicates with chamber 105 is under downstream pressure. Under those conditions there is no flow through check valve 114 and thus it serves to prevent fluid under downstream pressure from flowing into sample container L and varying the quantity of the sample.

Returning now to diaphragm 12 which is being forced down, it is pointed out that this downward movement of diaphragm 12 draws with it rod 63 which in turn pulls down cup 66 and rod 68. This train continues to move downward in this way until fulcrum points 213 and 214 are, for example, about ¼" below the horizontal center of fulcrum points 219 and 220. At this point springs 221 and 222 have created enough downward force to cause rod 68 to jump downward (which it is also free to do because of the same 5/16" or the like of free play mentioned above) causing the lower side of shoulder 86 on rod 68 to strike cam rollers 87 and 88 and force them downward about ¼" for example. This downward movement causes cam roller 89 to move upward about 3/32" and cam roller 90 to move down about 3/32", thus raising the conical lower end of rod 73 out of seat 30 and placing chamber 26 in communication with sample container L and lowering the conical lower end of rod 74 into seat 31 and cutting off communication between chamber 27 and the high pressure side of orifice plate 201. This completes one full cycle of the device, it now being restored to the position at which this description started.

Returning to cam rollers 89 and 90 it is pointed out that they are arranged so that when they are in their uppermost position their vertical centers are in line with the vertical center lines of fulcrums 82 and 83, respectively, so that even when shoulder 86 or enlarged portion 69 is moved away from cam rollers 87 and 88 the cams do not move but continue to hold discs 75 and 76 as the case may be against the tension of the springs 79 and 80 above them until they are moved again by shoulder 86 or enlarged portion 69 as described above. In this connection it may be noted also that the positions of rods 73 and 74 are always opposite, e. g. when one is up the other is down and vice versa.

From the above it can be seen that since the device uses liquid, from the upstream side of orifice plate 201, continuously to operate itself, it will be readily seen that a steady stream of liquid flows from the pipe line through the sampler and back to the pipe line so that a fresh supply of liquid is always present in the sampler device from which a truly representative sample is drawn. No liquid is allowed to stand within the draw-off lines and cause a dead sample to be taken or have a "lag" in the sampler system. Thus each time diaphragm 12 moves up or down fresh liquid from the upstream side flows in on one side and forces the liquid on the other side which flowed in from the upstream side on the preceding movement to return to the downstream side.

The sampler device thus, in effect, is a by-pass around the orifice plate. The speed at which it operates will, moreover, depend upon the speed with which the fluid flows through it since the more rapid the flow the faster the chambers on either side of diaphragm 12 will empty and fill and in so doing operate the spring trip mechanism. In the light of these facts it becomes apparent that the operating speed of the sampler will also be directly proportional to the rate of flow of fluid through the pipe line since the rate of flow of fluids through a system of pipes and fittings by-passed around an orifice plate will change in direct proportion to the rate of flow through the orifice because the pressure drop across the orifice plate is itself directly proportional to the rate of flow. Moreover, the number of samples taken will, therefore, also be proportional to the rate of flow in the pipe line, there being one taken for each complete operating cycle of the device. The stroke counter which records the number of complete operating cycles of the spring trip mechanism provides a means for determining with an error of less than two percent the quantity of fluid flowing through the pipe. The number of samples times a constant multiplier will give the quantity.

The above has to do with the relative speeds of the device and of the fluid flowing through the line. The actual speed of the device may also be of any desired rate without destroying these proportional relationships. It can be adjusted by means for restricting the rate of flow through the sampler such as valve 152 in the line from the sampler to the downstream side of the orifice plate. This can be set to give any desired rate of operation. Once this valve is set the sampler will operate as described above, however, in proportion to the rate of flow.

Advantages of the new sampler will be apparent from the above description. In particular, may be mentioned the practical feature that it takes discrete samples of liquid of uniform size from a pipe line, the number of which samples over any given period of time is directly proportional to the quantity of liquid passing through the pipe line in the same period of time, which is exactly what a sampler should do. It is especially applicable to the sampling of oil but is also suited for use in sampling fluids generally. Another feature which makes it particularly attractive for sampling oil pipe lines is that it does not require any outside source of power but instead operates entirely from the power obtained from the fluid flowing through the line through the medium of the orifice plate in the pipe line. From a practical angle the device has merit in that it is simple and easy to construct and can be varied readily to meet different conditions. For use within reasonable limits many parts can be standardized and variations within these limits can be compensated for by varying the size of diaphragm 12 and the size of the orifice and by adjusting the valve in the return line to the downstream side of the orifice plate. The first two are adjusted to the conditions of flow and the valve serves to control the rate at which samples are taken. Although the orifice plate must be installed directly in the pipe line, the remainder of the device can be installed at any reasonable distance from the pipe line since a continuous flow of fresh liquid from the pipe line through the sampler and back to the pipe line is passing at all times. While all moving parts of the device are accessible and can be changed or repaired without interfering with flow through the pipe line, few such changes or repairs will be required since the device operates at reasonably slow speed and consequently maintenance and repair costs are small.

It is apparent that many widely different embodiments of this invention may be made without departing from the spirit and scope thereof and therefore, it is not intended to be limited except as indicated in the appended claims.

We claim:

1. A device for removing a composite sample of a fluid passing through a pipe line, which comprises means in said pipe line for producing a pressure differential, a fluid connection outside said pipe line between the regions of different pressure in the pipe line, a gas tight sample container for collecting the composite sample in communication with said fluid connection and maintained under a pressure high enough to prevent escape of the sample and lower than that in the low pressure region in the pipe line whereby a second pressure differential is produced, means in said fluid connection for trapping discrete uniform samples, means for discharging said samples into said sample container and means responsive to the aforesaid pressure differentials for bringing said sample trapping means and said sample discharging means into operation alternately and at such a rate that the discrete uniform samples are discharged at a rate roughly proportional to the rate of flow of fluid through said pipe line.

2. A device for removing a composite sample of a fluid passing through a pipe line, which comprises an orifice plate in said pipe line for producing a pressure differential, a fluid connection outside said pipe line between the regions of different pressure in the pipe line, a gas tight sample container for collecting the composite sample in communication with said fluid connection and maintained under a pressure high enough to prevent escape of the sample and lower than that in the low pressure region in the pipe line whereby a second pressure differential is produced, means in said fluid connection for trapping discrete uniform samples, means for discharging said samples into said sample container and means responsive to the aforesaid pressure differentials through diaphragms controlling valves in said fluid connection for bringing said sample trapping means and said sample discharging means into operation alternately and at such a rate that the discrete uniform samples are discharged at a rate roughly proportional to the rate of flow of fluid through said pipe line.

3. A device for sampling a fluid passing through a pipe line which comprises an orifice plate in said pipe line producing a pressure differential, a fluid connection outside said pipe line between the regions of different pressure in the pipe line, a gas tight sample container for collecting the composite sample in communication through a first valve with a sample trapping space forming a part of said fluid connection, said sample container being maintained under a pressure high enough to prevent escape of the sample and lower than that in the low pressure region in the pipe line whereby a second pressure differential is produced, said fluid connection between the high pressure and low pressure sides of said orifice plate having a system of valves, including a second valve which controls the inlet to said sample trapping space, means including a spring trip mechanism having two positions and responsive to the pressure differential in the pipe line for controlling said first and second valves and arranged so that in moving from one position to another it alternately opens one of said two valves as it closes the other and in moving back reverses this operation, means responsive to said second pressure differential when said first valve is open for discharging a trapped sample into said sample container, a check valve communicating on its inlet side with said sample trapping space and on its outlet side with the downstream side of said orifice plate, and means responsive to the said pressure differentials for alternating the effect of the pressure differential in the pipe line on said means responsive to the pressure differential in the pipe line and controlling the spring trip mechanism.

4. A device as described in claim 3 further characterized in that it includes three separate means responsive to the pressure differentials each of which has two positions the first of which means controls said spring trip mechanism and responds to the pressure differential in the pipe line, the second of which controls two valves, one of which is always closing as the other is opening and the third of which controls one valve, said second and third means being responsive in one position to said fisrt pressure differential and in the other to said second pressure differential.

5. A device for removing a composite sample of a fluid passing through a pipe line, which comprises means in said pipe line for producing a pressure differential in response to fluid flow, a fluid connection outside said pipe line between regions of differential pressure in the pipe line, means in said fluid connection responsive to said pressure differential for trapping discrete uniform samples, a gas-tight container for collecting the samples, and means for ejecting said samples into said container whereby discrete uniform samples are discharged from said fluid connection at a rate roughly proportional to the rate of flow of fluid through said pipe line.

JOHN RAY POLSTON.
JOSEPH JOHNSON BOYD.